US007228211B1

(12) United States Patent
Lowrey et al.

(10) Patent No.: US 7,228,211 B1
(45) Date of Patent: Jun. 5, 2007

(54) TELEMATICS DEVICE FOR VEHICLES WITH AN INTERFACE FOR MULTIPLE PERIPHERAL DEVICES

(75) Inventors: Larkin Hill Lowrey, Seabrook, TX (US); Matthew J. Banet, Del Mar, CA (US); Paul Washicko, Carlsbad, CA (US)

(73) Assignee: HTI IP, LLC, New York, NY (US)

( * ) Notice: Subject to any disclaimer, the term of this patent is extended or adjusted under 35 U.S.C. 154(b) by 145 days.

(21) Appl. No.: 10/810,373

(22) Filed: Mar. 26, 2004

Related U.S. Application Data

(63) Continuation-in-part of application No. 10/447,713, filed on May 29, 2003, now Pat. No. 6,732,031, which is a continuation-in-part of application No. 10/431, 947, filed on May 8, 2003, now Pat. No. 6,957,133, which is a continuation of application No. 09/776, 106, filed on Feb. 1, 2001, now Pat. No. 6,636,790.

(60) Provisional application No. 60/220,986, filed on Jul. 25, 2000, provisional application No. 60/222,213, filed on Aug. 1, 2000, provisional application No. 60/222,152, filed on Aug. 1, 2000.

(51) Int. Cl.
*G01C 17/00* (2006.01)

(52) U.S. Cl. ............................ 701/29; 701/33; 701/36; 701/213

(58) Field of Classification Search .................. 701/29, 701/30–33, 36, 213–214; 342/357.13, 357.06, 342/357.12; 340/988, 500; 307/9.1, 10.1
See application file for complete search history.

(56) References Cited

U.S. PATENT DOCUMENTS 3,748,894 A 7/1973 White et al.
4,258,421 A 3/1981 Juhasz et al.
4,602,127 A 7/1986 Neely et al.
4,690,475 A 9/1987 McElroy (Continued)

FOREIGN PATENT DOCUMENTS

CA 2133673 10/1994

(Continued)

OTHER PUBLICATIONS

RD-422061 A; Anonymous; Jun. 10, 1999; Abstract, Using Internet for vehicle diagnostics-enabling using to operate vehicle personal computer to direct web browser to vehicle diagnostics website . . . .

(Continued)

*Primary Examiner*—Y. Beaulieu
(74) *Attorney, Agent, or Firm*—Stephen C. Glazier; Kirkpatrick & Lockhart Preston Gates Ellis LLP

(57) ABSTRACT

In one embodiment, the invention provides an in-vehicle telematics system featuring: 1) a controller; 2) a diagnostics system configured to receive diagnostic information from a host vehicle; 3) a position-locating system configured to determine the host vehicle's location information; 4) a communication interface configured to send additional information to a peripheral system other than the diagnostic position-locating systems; and, 5) a wireless transmitter configured to transmit information through a wireless network to an Internet-accessible website.

48 Claims, 10 Drawing Sheets

U.S. PATENT DOCUMENTS

| | | | | |
|---|---|---|---|---|
| 4,694,408 | A | 9/1987 | Zaleski | |
| 4,926,330 | A | 5/1990 | Abe et al. | |
| 4,956,777 | A | 9/1990 | Cearley et al. | |
| 5,003,317 | A | 3/1991 | Gray et al. | |
| 5,026,293 | A | 6/1991 | Wilson | |
| 5,050,080 | A | 9/1991 | Abe | |
| 5,157,610 | A | 10/1992 | Asano et al. | |
| 5,223,844 | A | 6/1993 | Mansell et al. | |
| 5,289,378 | A | 2/1994 | Miller et al. | |
| 5,343,906 | A | 9/1994 | Tibbals, III | |
| 5,442,553 | A | 8/1995 | Parrillo | |
| 5,450,321 | A | 9/1995 | Crane | |
| 5,463,567 | A | 10/1995 | Boen et al. | |
| 5,473,540 | A | 12/1995 | Schmitz | |
| 5,479,479 | A | 12/1995 | Braitberg et al. | |
| 5,491,486 | A | 2/1996 | Welles et al. | |
| 5,532,927 | A | 7/1996 | Pink et al. | |
| 5,537,336 | A | 7/1996 | Joyce | |
| 5,550,551 | A | 8/1996 | Alesio | |
| 5,574,427 | A | 11/1996 | Cavallaro | |
| 5,671,141 | A | 9/1997 | Smith et al. | |
| 5,673,305 | A | 9/1997 | Ross | |
| 5,680,328 | A | 10/1997 | Skorupski et al. | |
| 5,732,074 | A | 3/1998 | Spaur et al. | |
| 5,737,215 | A | 4/1998 | Schricker et al. | |
| 5,754,965 | A | 5/1998 | Hagenbuch | |
| 5,758,300 | A | 5/1998 | Abe | |
| 5,774,828 | A | 6/1998 | Brunts et al. | |
| 5,781,871 | A | 7/1998 | Mezger et al. | |
| 5,797,134 | A | 8/1998 | McMillan et al. | |
| 5,798,647 | A | 8/1998 | Martin et al. | |
| 5,808,907 | A | 9/1998 | Shetty et al. | |
| 5,828,585 | A | 10/1998 | Welk et al. | |
| 5,850,209 | A | 12/1998 | Lemke et al. | |
| 5,884,202 | A | 3/1999 | Arjomand | |
| 5,928,292 | A | 7/1999 | Miller et al. | |
| 5,941,918 | A | 8/1999 | Blosser | |
| 5,964,821 | A | 10/1999 | Brunts et al. | |
| 6,020,654 | A * | 2/2000 | Chutorash | 307/10.1 |
| 6,064,970 | A | 5/2000 | McMillan et al. | |
| 6,104,988 | A | 8/2000 | Klarer | |
| 6,141,611 | A | 10/2000 | Mackey et al. | |
| 6,154,658 | A * | 11/2000 | Caci | 455/466 |
| 6,167,426 | A | 12/2000 | Payne et al. | |
| 6,236,933 | B1 | 5/2001 | Lang | |
| 6,240,295 | B1 | 5/2001 | Kennedy et al. | |
| 6,263,268 | B1 | 7/2001 | Nathanson | |
| 6,285,953 | B1 | 9/2001 | Harrison et al. | |
| 6,295,492 | B1 | 9/2001 | Lang et al. | |
| 6,338,152 | B1 | 1/2002 | Fera et al. | |
| 6,339,745 | B1 | 1/2002 | Novik | |
| 6,354,868 | B1 | 3/2002 | Korczynski et al. | |
| 6,356,205 | B1 | 3/2002 | Salvo et al. | |
| 6,356,823 | B1 | 3/2002 | Iannotti et al. | |
| 6,400,701 | B2 | 6/2002 | Lin et al. | |
| 6,408,232 | B1 | 6/2002 | Cannon et al. | |
| 6,429,773 | B1 | 8/2002 | Schuyler | |
| 6,442,460 | B1 | 8/2002 | Larson et al. | |
| 6,459,988 | B1 | 10/2002 | Fan et al. | |
| 6,487,479 | B1 | 11/2002 | Nelson | |
| 6,487,494 | B2 | 11/2002 | Odinak et al. | |
| 6,487,717 | B1 | 11/2002 | Brunemann et al. | |
| 6,496,777 | B2 | 12/2002 | Tennison et al. | |
| 6,502,030 | B2 | 12/2002 | Hilleary | |
| 6,505,106 | B1 * | 1/2003 | Lawrence et al. | 701/35 |
| 6,507,786 | B2 | 1/2003 | Flick | |
| 6,522,267 | B2 | 2/2003 | Flick | |
| 6,526,335 | B1 | 2/2003 | Treyz et al. | |
| 6,526,460 | B1 | 2/2003 | Dauner et al. | |
| 6,529,159 | B1 | 3/2003 | Fan et al. | |
| 6,552,682 | B1 | 4/2003 | Fan | |
| 6,556,889 | B2 | 4/2003 | Rudick et al. | |
| 6,556,905 | B1 | 4/2003 | Mittelsteadt et al. | |
| 6,564,127 | B1 | 5/2003 | Bauerle et al. | |
| 6,580,916 | B1 | 6/2003 | Weisshaar et al. | |
| 6,594,576 | B2 | 7/2003 | Fan et al. | |
| 6,594,579 | B1 | 7/2003 | Lowrey et al. | |
| 6,604,032 | B1 | 8/2003 | Moller | |
| 6,604,033 | B1 | 8/2003 | Banet et al. | |
| 6,604,038 | B1 | 8/2003 | Lesesky et al. | |
| 6,609,051 | B2 | 8/2003 | Fiechter et al. | |
| 6,611,686 | B1 | 8/2003 | Smith et al. | |
| 6,611,739 | B1 | 8/2003 | Harvey et al. | |
| 6,611,740 | B2 | 8/2003 | Lowrey et al. | |
| 6,611,755 | B1 | 8/2003 | Coffee et al. | |
| 6,636,790 | B1 | 10/2003 | Lightner et al. | |
| 6,664,922 | B1 | 12/2003 | Fan | |
| 6,675,081 | B2 | 1/2004 | Shuman et al. | |
| 6,687,587 | B2 | 2/2004 | Kacel | |
| 6,694,234 | B2 | 2/2004 | Lockwood et al. | |
| 6,718,425 | B1 | 4/2004 | Pajakowski et al. | |
| 6,732,031 | B1 | 5/2004 | Lightner et al. | |
| 6,732,032 | B1 | 5/2004 | Banet et al. | |
| 6,751,452 | B1 | 6/2004 | Kupczyk et al. | |
| 6,754,485 | B1 | 6/2004 | Obradovich et al. | |
| 6,757,262 | B1 * | 6/2004 | Weisshaar et al. | 370/310 |
| 6,795,017 | B1 | 9/2004 | Puranik et al. | |
| 6,832,140 | B2 | 12/2004 | Fan et al. | |
| 6,836,708 | B2 | 12/2004 | Tripathi | |
| 6,845,362 | B2 | 1/2005 | Furuta et al. | |
| 6,862,524 | B1 | 3/2005 | Nagda et al. | |
| 6,867,733 | B2 | 3/2005 | Sandhu et al. | |
| 6,882,313 | B1 | 4/2005 | Fan et al. | |
| 6,889,064 | B2 * | 5/2005 | Baratono et al. | 455/569.2 |
| 6,922,566 | B2 | 7/2005 | Puranik et al. | |
| 6,947,760 | B2 * | 9/2005 | Weisshaar et al. | 455/509 |
| 6,973,324 | B2 * | 12/2005 | Weisshaar et al. | 455/510 |
| 2001/0016789 | A1 | 8/2001 | Staiger | |
| 2001/0033225 | A1 | 10/2001 | Razavi et al. | |
| 2002/0008644 | A1 | 1/2002 | Flick | |
| 2002/0008645 | A1 | 1/2002 | Flick et al. | |
| 2002/0016655 | A1 | 2/2002 | Joao | |
| 2002/0029101 | A1 | 3/2002 | Larson et al. | |
| 2002/0032505 | A1 | 3/2002 | Good | |
| 2002/0078458 | A1 | 6/2002 | Furon et al. | |
| 2002/0118222 | A1 | 8/2002 | Fogarty | |
| 2002/0133273 | A1 | 9/2002 | Lowrey et al. | |
| 2002/0140545 | A1 | 10/2002 | Nietupski et al. | |
| 2002/0143446 | A1 | 10/2002 | Rogers et al. | |
| 2002/0150050 | A1 | 10/2002 | Nathanson | |
| 2002/0173889 | A1 | 11/2002 | Odinak et al. | |
| 2002/0177476 | A1 | 11/2002 | Chou | |
| 2003/0004623 | A1 | 1/2003 | Namaky et al. | |
| 2003/0004624 | A1 | 1/2003 | Wilson et al. | |
| 2003/0009270 | A1 | 1/2003 | Breed | |
| 2003/0078722 | A1 | 4/2003 | Odinak et al. | |
| 2003/0083809 | A1 | 5/2003 | Hatano | |
| 2003/0093204 | A1 | 5/2003 | Adachi et al. | |
| 2003/0130005 | A1 | 7/2003 | Weisshaar et al. | |
| 2003/0130774 | A1 | 7/2003 | Tripathi et al. | |
| 2003/0139179 | A1 | 7/2003 | Fuchs et al. | |
| 2003/0147534 | A1 | 8/2003 | Ablay et al. | |
| 2003/0182055 | A1 | 9/2003 | Curatolo et al. | |
| 2003/0231118 | A1 | 12/2003 | Kitson | |
| 2003/0236596 | A1 | 12/2003 | Eisenmann et al. | |
| 2004/0023645 | A1 | 2/2004 | Olsen et al. | |
| 2004/0039502 | A1 | 2/2004 | Wilson et al. | |
| 2004/0044454 | A1 | 3/2004 | Ross et al. | |
| 2004/0104842 | A1 | 6/2004 | Drury et al. | |
| 2004/0196182 | A1 | 10/2004 | Unnold | |

2005/0144318 A1* 6/2005 Chang ........................ 709/245

FOREIGN PATENT DOCUMENTS

| | | | |
|---|---|---|---|
| EP | 0816820 | A2 | 1/1998 |
| WO | WO 00/40038 | | 7/2000 |
| WO | WO 00/79727 | | 12/2000 |

OTHER PUBLICATIONS

Bary W. Wilson et al., Modular system for multiparameter in-line machine fluid analysis (Technology showcase Apr. 3-6, 2000).
40 CFR 51, Ch. I (Jul. 1, 2001 Edition), pp. 130-481.
40 CFR 85, Ch. I (Jul. 1, 2001 Edition), pp. 502-640.
Motorola, Inc., "Automotive ISO 9141 Serial Link Driver," 1996, p. 1-12, no month.
D. John Oliver, Intel Corporation, "Implementing the J 1850 Protocol", no date.
U.S. Appl. No. 09/776,033, filed Feb. 1, 2001, Banet et al.
U.S. Appl. No. 09/776,083, filed Feb. 1, 2001, Banet et al.
U.S. Appl. No. 09/776,106, filed Feb. 1, 2001, Lightner et al.
U.S. Appl. No. 09/804,888, filed Mar. 13, 2001, Lowrey et al.
U.S. Appl. No. 09/808,690, filed Mar. 14, 2001, Lowrey et al.
U.S. Appl. No. 09/908,440, filed Jul. 18, 2001, Lightner et al.
U.S. Appl. No. 09/0922,954, filed Aug. 6, 2001, Lowrey et al.
U.S. Appl. No. 10/301,010, filed Nov. 21, 2002, Lightner et al.
U.S. Appl. No. 10/431,947, filed May 8, 2003, Hunt et al.
U.S. Appl. No. 10/447,713, filed May 29, 2003, Lightner et al.
U.S. Appl. No. 10/456,246, filed Jun. 6, 2003, Lowrey et al.
U.S. Appl. No. 10/456,788, filed Jun. 6, 2003, Banet et al.
U.S. Appl. No. 10/614,665, filed Jul. 7, 2003, Lowrey et al.
U.S. Appl. No. 10/615,516, filed Jul. 8, 2003, Lightner et al.
U.S. Appl. No. 10/625,942, filed Jul. 24, 2003, Banet et al.
U.S. Appl. No. 10/626,779, filed Jul. 24, 2003, Lightner et al.
U.S. Appl. No. 10/626,810, filed Jul. 24, 2003, Lowrey et al.
U.S. Appl. No. 10/632,033, filed Jul. 31, 2003, Banet et al.
U.S. Appl. No. 10/823,478, filed Apr. 13, 2004, Williams et al.
U.S. Appl. No. 10/831,952, filed Apr. 26, 2004, Hunt et al.
U.S. Appl. No. 10/841,724, filed May 7, 2004, Lightner et al.
U.S. Appl. No. 10/440,596, filed May 19, 2003, Lang et al.
Frank Di Genova, Thomas C. Austin, S. Kingsley Macomber (Sierra Research, Inc.). Incorporation of Wireless Communications into Vehicle On-Board Diagnostic (OBD) Systems. Report No. SR00-01-03 prepared for California Air Resources Board. Jan. 18, 2000.
Definition of "Chipset", Wikipedia. http://en.wikipedia.org/wiki/Chipset. Feb. 23, 2006.

* cited by examiner

TELEMATICS DEVICE FOR VEHICLES WITH AN INTERFACE FOR MULTIPLE PERIPHERAL DEVICES

This application is a continuation-in-part of prior application Ser. No. 10/447,713, filed May 29, 2003 now U.S. Pat. No. 6,732,031, which is a continuation of prior application Ser. No. 09/776,106, filed Feb. 1, 2001 now U.S. Pat. No. 6,636,790, which claims the benefit of U.S. Provisional Application No. 60/220,986, filed Jul. 25, 2000, U.S. Provisional Application No. 60/222,213, filed Aug. 1, 2000 and U.S. Provisional Application No. 60/222,152, filed Aug. 1, 2000, the contents of each prior application and provisional application incorporated herein by reference. This application is also a continuation-in-part of prior application Ser. No. 10/431,947, filed May 8, 2003 now U.S. Pat. No. 6,957,133, incorporated herein by reference.

BACKGROUND

1. Field

Embodiments of the present invention related to vehicle telematics.

2. Descriptions of Related Art

Vehicles, such as light-duty cars and trucks and heavy-duty tractor/trailers, can include 'telematics' systems that monitor information describing the vehicle's location and diagnostic condition. Such telematics systems typically include a conventional global positioning system ('GPS') that receives signals from orbiting satellites and a processor that analyzes these signals to calculate a GPS 'fix'. The fix, which features data such as the vehicle's latitude, longitude, altitude, heading, and velocity, typically describes the vehicle's location with an accuracy of about 10 meters or better.

Telematics systems can include circuitry that monitors the host vehicle's diagnostic system. As an example of a diagnostic system, light-duty automobiles and trucks beginning with model year 1996 include an on-board diagnostic (OBD-II) system as mandated by the Environmental Protection Agency (EPA). OBD-II systems typically operate under one of the following communication protocols: J1850 VPW (Ford); J1850 VPWM (General Motors); ISO 9141-2 (most Japanese and European vehicles); Keyword 2000 (some Mercedes and Hyundai vehicles); and CAN (a newer protocol used by many vehicles manufactured after 2004). OBD-II systems monitor the vehicle's electrical, mechanical, and emissions systems and generate data that are processed by a vehicle's engine control unit (ECU) to detect malfunctions or deterioration in performance. The data typically include parameters such as vehicle speed (VSS), engine speed (RPM), engine load (LOAD), and mass air flow (MAF). The ECU can also generate diagnostic trouble codes (DTCs), which are 5-digit codes (e.g., 'P0001') indicating electrical or mechanical problems with the vehicle. Most vehicles manufactured after 1996 include a standardized, serial 16-cavity connector, sometimes referred to herein as an 'OBD-II connector', that makes these data available. The OBD-II connector serially communicates with the vehicle's ECU and typically lies underneath the vehicle's dashboard.

Heavy-duty trucks typically include a diagnostic system, referred to herein as a 'truck diagnostic system', which is analogous to the OBD-II systems present in light-duty vehicles. Truck diagnostic systems typically operate a communication protocol called J1708/J1587 or J1939 that collects diagnostic information from sensors distributed in the truck, processes this information, and then makes it available through a 6 or 9-pin connector, referred to herein as 'the truck diagnostic connector', typically located in the truck's interior.

BRIEF DESCRIPTION OF DRAWINGS

The features and advantages of embodiments of the present invention can be understood by reference to the following detailed description taken with the drawings of various embodiments of the present invention.

DETAILED DESCRIPTION

Figure 1:
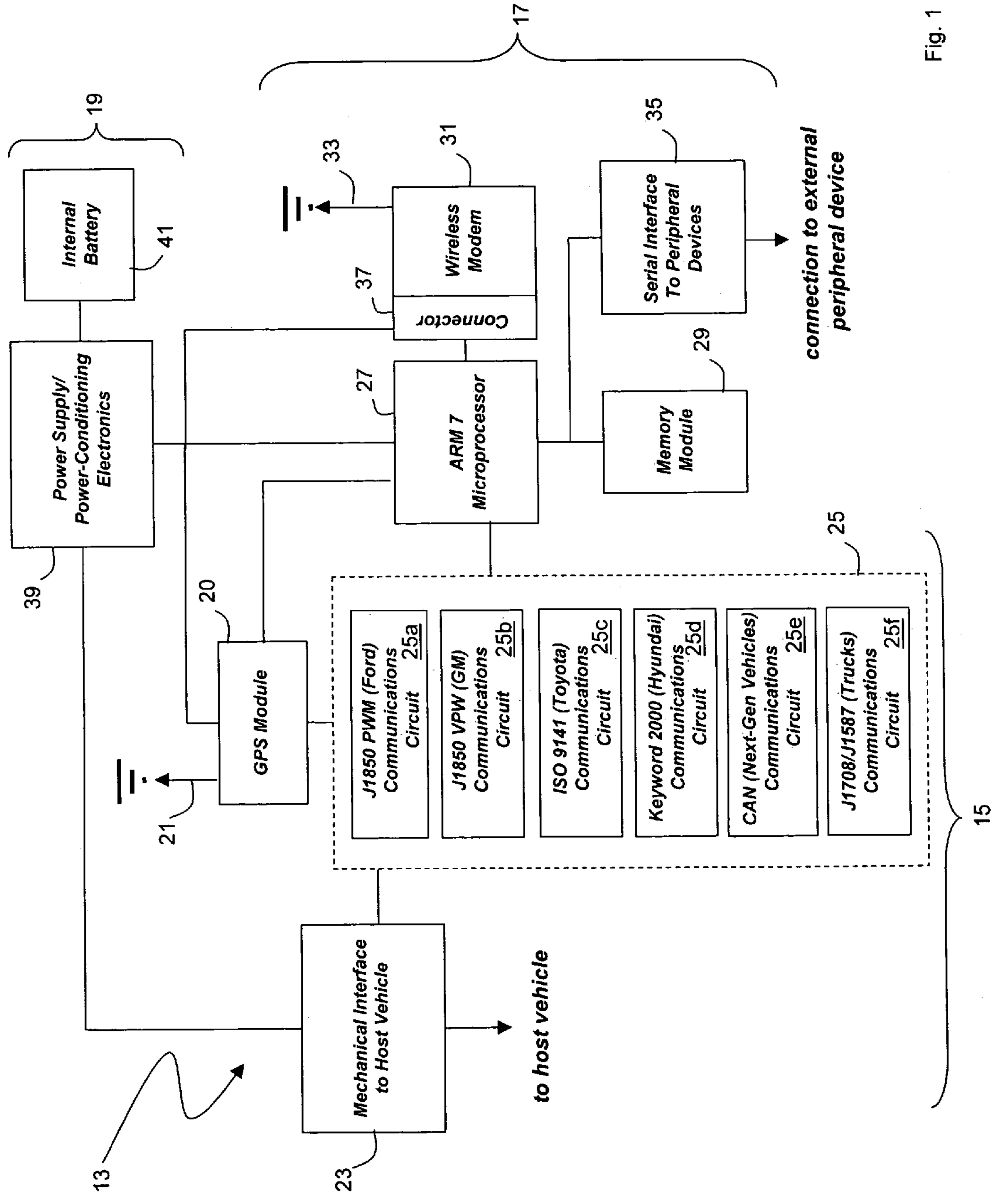
FIG. 1 is a schematic drawing of an in-vehicle telematics device featuring a wireless modem, GPS, vehicle-communication circuits, and a serial interface for connecting one or more peripheral devices, according to one embodiment of the present invention.

The following description refers to the accompanying drawings that illustrate certain embodiments of the present invention. Other embodiments are possible and modifications may be made to the embodiments without departing from the spirit and scope of the invention. Therefore, the following detailed description is not meant to limit the present invention. Rather, the scope of the present invention is defined by the appended claims.

It is an object of an embodiment of the present invention to provide a small-scale, wireless, internet-based telematics system for monitoring and analyzing a vehicle's GPS and diagnostic data. The embodiment of the system includes an in-vehicle telematics device that features a serial interface to one or more peripheral devices, including but not limited to the following: 1) liquid-crystal display (LCD) and keyboard; hand's-free cellular telephone kit; 3) panic button; 4) short-range wireless transmitter (e.g., a Bluetooth™ or 802.11b transmitter); and 5) a secondary modem (e.g. a satellite modem).

In the embodiment, the peripheral devices, which connect through the serial interface using a universal connector, expand the capabilities of the telematics device to include, among other things, text messaging between a driver and a fleet manager; operation of a cellular telephone in a convenient 'hand's free' mode; notification of authorities in case of emergency; short-range, high-speed data communication; and world-wide wireless coverage.

More specifically, in one embodiment, the invention provides an in-vehicle telematics system featuring: 1) a controller; 2) a diagnostics system configured to receive diagnostic information from a host vehicle; 3) a position-locating system configured to determine the host vehicle's location information; 4) a communication interface configured to send additional information to a peripheral system other than the diagnostic position-locating systems; and, 5) a wireless transmitter configured to transmit information through a wireless network to an Internet-accessible website.

In certain embodiments, the peripheral device can be a display, such as a LCD. In this case the controller features machine-readable computer code, e.g. firmware, which controls the display. For example, the computer code can be configured to render a text message on the display. The text message can be sent from the Internet-accessible website, or from a cellular telephone or a personal digital assistant ('PDA'). Preferably the display is configured to mount inside the vehicle.

In other embodiments, the peripheral device features a voice interface that receives audio information and sends the information to the wireless transmitter. For example, the peripheral device can be a hand's-free phone kit. The hand's-free phone kit can contain a Bluetooth™ transmitter configured to send information to and receive information from a user's cellular telephone. Alternatively, the telematics device includes the Bluetooth™ transmitter, e.g. it is mounted on an internal circuit board. In still other embodiments, the peripheral device is a short-range wireless transmitter, e.g. a transmitter operating a Bluetooth™, 802.11, part-15, or infrared wireless protocol.

In another embodiment, the peripheral device includes a button (e.g. a 'panic button') that, when depressed, sends a signal through the interface to the controller. Or the peripheral device can be a secondary wireless modem, such as a satellite modem. The interface used in the telematics device may be a serial interface, such as an $I^2C$, RS232, RS485, USB, CAN or SPI serial interface.

In an embodiment, the position-locating system may be a conventional GPS (that interprets satellite signals to determine location) or a network-assisted GPS (that interprets both satellite and terrestrial wireless signals to determine location). The controller may be a microcontroller or a microprocessor, e.g. an ARM7 or ARM9 microprocessor.

In another embodiment, the invention provides an in-vehicle telematics system that features a controller that runs machine-readable computer code configured to receive diagnostic information from a host vehicle and location information from a position-locating system. The controller is additionally configured to receive and send information through a serial interface to a peripheral device other than the diagnostic and position-locating systems. The telematics system uses a wireless transmitter to transmit diagnostic and location information through a wireless network to an Internet-accessible website.

In another embodiment, the invention provides an in-vehicle telematics system that features the above-described components for determining diagnostic and location information combined with a voice interface configured to receive and transmit voice information.

In various embodiments, the same wireless transmitter transmits location information through a wireless network to the Internet-accessible website, and voice information through the same wireless network to an external telephone. Here, the controller further comprises a speech-recognition module, e.g. machine-readable computer code that analyzes a user's speech to determine a telephone number and other commands.

In another embodiment of the invention, the telematics system features a housing that covers the controller and the position-location system, and additionally includes a port that connects to the external peripheral system. In this case, the system can include a cable or a wireless interface that sends information to and receives information from the external peripheral system.

In yet another embodiment of the invention, the invention provides a telematics system that features a short-range wireless transmitter (e.g. a Bluetooth™ transmitter) configured to send information to an external peripheral device, and a long-range wireless transmitter (e.g. a cellular modem) configured to transmit information through a wireless network to an Internet-accessible website.

Various embodiments of the invention have many advantages. In particular, with various embodiments of the invention described herein, different peripheral devices can easily and quickly connect to the telematics device through its serial interface. This means a user can add valuable functionality to the telematics device, and optimize the device for a particular application, in a matter of minutes. For example, using the serial interface, the user can add a simple, LCD display and keyboard. With this, drivers and fleet managers can communicate with text messages to optimize the fleet's efficiency. Or a hand's-free cellular telephone kit (e.g., a kit featuring a Bluetooth™ module or cradle) can connect through the serial interface to give a driver a safe, convenient way to place cellular phone calls. To even further enhance safety and security, a peripheral device featuring a panic button can connect through the serial interface. Depressing the panic button automatically sends a message to, e.g., a call center, that in turn would notify the appropriate authorities. Peripheral devices running a Bluetooth™ or 802.11b wireless protocol can quickly send large amounts of information (e.g. diagnostic information collected and stored over long periods of time) to a proximal hub. And a peripheral device featuring a secondary modem, such as a satellite or CDMA modem, can transmit and receive information in regions in which the primary modem may not operate.

These features, made possible by the serial interface, complement basic advantages provided by the telematics system. For example, embodiments of this system provide wireless, real-time transmission and analysis of GPS and diagnostic data, followed by analysis and display of these data using an Internet-hosted web site. This makes it possible to characterize the vehicle's performance and determine its location in real-time from virtually any location that has Internet access, provided the vehicle being tested includes the below-described telematics system. This information is complementary and, when analyzed together, can improve conventional services such as roadside assistance, vehicle theft notification and recovery, and remote diagnostics. For example, the information can indicate a vehicle's location, its fuel level and battery voltage, and whether or not it has any active DTCs. Using this information, a call center can dispatch a tow truck with the appropriate materials (e.g., extra gasoline or tools required to repair a specific problem) to repair the vehicle accordingly.

Embodiments of the present invention may be useful in a wide range of vehicles. Examples of such vehicles include automobiles and trucks, as well as commercial equipment, medium and heavy-duty trucks, construction vehicles (e.g., front-end loaders, bulldozers, forklifts), powered sport vehicles (e.g., motorboats, motorcycles, all-terrain vehicles, snowmobiles, jet skis, and other powered sport vehicles), collision repair vehicles, marine vehicles, and recreational vehicles. Further, embodiments may be useful in the vehicle care industry.

Figure 2:
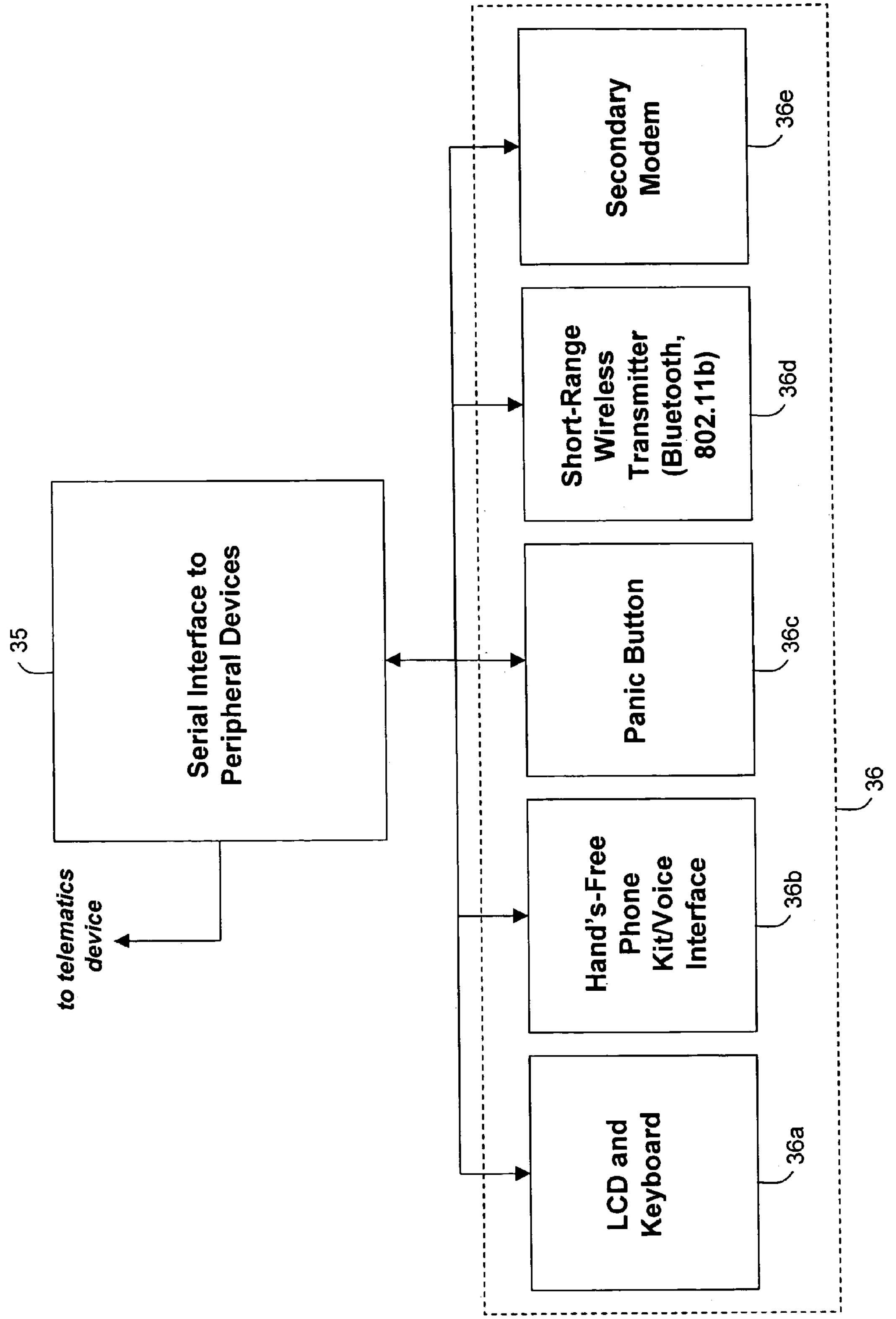
FIG. 2 is a schematic drawing of the serial interface of FIG. 1 connecting to peripheral devices including an LCD display and keyboard, a hand's-free cellular phone kit, a panic button, a short-range wireless transmitter, and a secondary modem, according to one embodiment of the present invention.

FIGS. 1 and 2 show schematic drawings of a small-scale telematics device 13 according to an embodiment of the invention that monitors diagnostic and location-based data from a host vehicle and wirelessly transmits these data to an Internet-accessible website. The telematics device 13 features a serial interface 35 that connects to peripheral devices, described in detail below. The serial interface 35 features a connector that mates with an associated connector that is universal to each peripheral device. The telematics device 13 runs firmware, described in more detail below, that recognizes the peripheral device and serially communicates with it so that information can pass across the serial interface 35. The serial interface 35 additionally supplies power and ground so that the peripheral device does not require an additional power supply to operate.

Referring to FIG. 2, for example, peripheral devices according to an embodiment of the invention may include: 1) LCD and keyboard **36*a* for sending, receiving, and displaying text messages; 2) a hand's-free cellular phone kit and voice interface 36*b* for safe, convenient voice communications; 3) a panic button 36*c* for sending a short, automated message and location in case of emergency; 4) a short-range, high-bandwidth wireless transmitter 36*d* operating Bluetooth™ or 802.11b; or 5) a secondary modem 36*e***, e.g. a cellular or satellite modem.

In addition to the serial interface to peripheral devices 35, the telematics device 13 may feature: 1) a data-generating portion 15 that generates both diagnostic and location-based data; 2) a data-processing portion 17 that processes and wirelessly transmits information; and 3) a power-management portion 19 that supplies power to each circuit element in the device 13.

The circuit elements in each portion 15, 17, 19 may be integrated into small-scale, silicon-based microelectronic devices (e.g., ASICs). This means the entire telematics device 13 may be incorporated into a single 'chip set', described by a reference design, thereby reducing its size, manufacturing costs, and potential post-installation failures.

The data-generating portion 15 may feature a GPS module 20 that receives wireless signals from orbiting GPS satellites through an integrated GPS antenna 21. Once the antenna 21 receives signals from at least three satellites, the GPS module 20 processes them to calculate a GPS 'fix' that includes the host vehicle's location-based data, e.g. latitude, longitude, altitude, heading, and velocity. The GPS module 20 calculates location-based data at a programmable interval, e.g. every minute.

The data-generating portion 15 may communicate with the host vehicle through an electrical/mechanical interface 23 that connects to the vehicle's diagnostic connector. As described above, for light-duty vehicles, this connector is an EPA-mandated 16-cavity connector, referred to herein as the OBD-II connector. For heavy-duty trucks, this connector is either a 6 or 9-pin connector, referred to herein as the truck diagnostic connector.

The OBD-II or truck diagnostic connector, may be located underneath the vehicle's steering column, provides direct access to diagnostic data stored in memory in the vehicle's ECU. The entire vehicle-communication circuit 25 manages communication through the electrical/mechanical interface 23 with separate modules **25*a*–25*e* for different vehicle buses (e.g., those featured in Ford, GM, Toyota, and heavy-duty trucks). Each module 25*a*–25*e* is a separate circuit within the vehicle-communication circuit 25**. These circuits, for example, can be integrated into an application-specific integrated circuit (ASIC), or can be included as discrete circuits processed on a printed circuit board.

The vehicle-communication circuit additionally may include logic that detects the communication protocol of the host vehicle, and then selects this protocol to communicate with the vehicle. Once the protocol is selected, the electrical/mechanical interface 23 receives diagnostic data from the vehicle according to a serial protocol dictated by the appropriate vehicle-communication circuit 25. The electrical/mechanical interface 23 passes this information to the data-processing portion 17 for analysis and wireless transmission.

The data-processing portion 17 may feature a 16-bit ARM7 microprocessor 27 that manages communication with each external peripheral device, along with the different elements of the data-generating portion 15. For a peripheral device featuring an LCD display and keyboard, for example, the microprocessor runs firmware that receives and processes an incoming text message, and then displays this text message on the LCD. Conversely, the microprocessor 27 interprets keystrokes from the keyboard, formulates these into a message, and transmits the message through a wireless network, as described in more detail below.

The microprocessor 27 additionally receives and processes diagnostic information from the data-communication circuit 25 and location-based information from the GPS module 20. For example, the microprocessor 27 can process diagnostic data describing the host vehicle's speed, mass air flow, and malfunction indicator light to calculate, respectively, an odometer reading, fuel efficiency, and emission status. These calculations are described in more detail in patent applications entitled 'INTERNET-BASED METHOD FOR DETERMINING A VEHICLE'S FUEL EFFICIENCY' (U.S. Pat. No. 6,594,579) and 'WIRELESS DIAGNOSTIC SYSTEM FOR CHARACTERIZING A VEHICLE'S EXHAUST EMISSIONS' (U.S. Pat. No. 6,604,033), the contents of which are incorporated herein by reference.

The microprocessor 27 additionally stores firmware and pre and/or post-processed diagnostic data in a memory module 29. The memory module 29 also stores a file-managing operating system (e.g., Linux) that runs on the microprocessor 27. During operation, the memory module can additionally function as a 'data logger' where both diagnostic and location-based data are captured at high rates (e.g., every 200 milliseconds) and then read out at a later time.

With firmware the microprocessor 27 formats information into unique packets and serially transfers these packets to a wireless modem 31. Each formatted packet includes, e.g., a header that describes its destination and the wireless modem's numerical identity (e.g., its 'phone number') and a payload that includes the information. For example, the packets can include diagnostic or location information, a text message, a short message generated from a panic button that indicates a problem with the user or vehicle. The wireless modem 31 operates on a wireless network (e.g., CDMA, GSM, GPRS, Mobitex, DataTac, ORBCOMM) and transmits the packets through an antenna 33 to the network. The antenna 33 can be an external antenna, or can be embedded into a circuit board or mechanical housing that supports the wireless modem 31. Once transmitted, the packets propagate through the network, which delivers them to an Internet-accessible website, as described in more detail with reference to FIG. 5.

The power-management portion 19 of the wireless appliance 13 features a power supply and power-conditioning electronics 39 that receive power from the electrical/mechanical interface 23 and, in turn, supply regulated DC power to circuit elements in the data-generating 15 and data-processing 17 portions, and through the serial interface 35 to the connected peripheral device. In this application, the power-management portion may switch 12 to 14 volts from the vehicle's battery to a lower voltage, e.g., 3.3 to 5 volts, to power the circuit elements and the connected peripheral device. The mechanical interface 23, in turn, attaches to the host vehicle's diagnostic connector, which receives power directly from the vehicle's standard 12-volt battery. An internal battery 41 connects to the power supply and power-conditioning electronics 39 and supplies power in case the telematics device is disconnected from the vehicle's power-supplying diagnostic connector. Additionally, the power supply and power-conditioning electronics 39 continually recharge the internal battery 41 so that it can supply back-up power even after extended use.

FIG. 2 is a schematic drawing of an embodiment that shows the serial interface 35 connected to a variety of peripheral devices 36*a–e*. Table 1 describes some of the possible peripheral devices 36*a–e*, the corresponding parameters that are received or transmitted through the serial interface, and the potential applications of these devices. The serial interface supplies power and ground to each peripheral device. For some devices, such as for a hand's-free phone kit, these are the only parameters supplied by the serial interface. In this case, the phone kit connects to a user's cellular telephone, which in turn transmits and receives voice calls. In other cases, such as for the LCD and keyboard and secondary modem, the serial interface additionally supplies and receives information (e.g., diagnostic or location information, text messages).

Table 1 is not meant to be exhaustive, and thus peripheral devices not described therein may also connect to the telematics device.

TABLE 1 peripheral devices, the parameters they receive or transmit through the serial interface, and potential applications

| Device | Transmitted/Received Serial Information | Application |
|---|---|---|
| LCD and keyboard | location, diagnostic, text messages | fleet management |
| hand's-free cellular phone kit | none | voice calls |
| panic button | location, diagnostic, bit stream | vehicle emergency |
| high-bandwidth short-range transmitter | location, diagnostic, text messages | vehicle repair; data mining |
| secondary modem stolen-vehicle recovery; diagnostics | location, diagnostic, text messages | fleet management; |

Each of the peripheral devices 36*a–e* listed in Table 1 may connect to the telematics device using a standard, 4-pin connector attached to a cable. The connector and cable are designed so to be uniform so that any device that transmits or receives information can connect to and operate with the telematics device. As described above, the pins in the connector supply power, ground, and a serial communication interface that passes information between the telematics device and the peripheral device. The serial interface 35 is controlled by a microprocessor (e.g., an ARM 7 shown in FIG. 1) operating within the telematics device. The ARM 7 runs firmware that recognizes the connected peripheral device, as described in more detail below, and subsequently powers up and begins communicating with the device upon installation.

The serial link for connecting peripheral devices to the serial interface 35 may be a conventional $I^2C$ bus connected through a 4-pin connection. $I^2C$ is a 2-wire, synchronous serial communication interface developed by Phillips Semiconductor. With this interface, two wires, serial data (SDA) and serial clock (SCL), carry information between the peripheral device and the telematics device. According to $I^2C$, each byte of information put on the SDA line must be 8-bits long, but the number of bytes transmitted per transfer is unrestricted. Using $I^2C$, the peripheral device can operate as either a transmitter or receiver. The ARM7 microprocessor controls this connection with an $I^2C$ transceiver that may be integrated into its circuitry.

Both SDA and SCL are bi-directional lines and connect to a positive supply voltage through a pull-up resistor (which may be between 4.7k and 10k). When the bus is free, both lines are high. Each peripheral device connected through $I^2C$ provides a unique address (generated by, e.g., an EEPROM, RTC or I/O expander) that is recognized by the telematics device. This means, following installation, the telematics device can recognize the attached peripheral device and begin operation without any input from the installer.

$I^2C$ is described in more detail in: http://www.philipslogic.com, the contents of which are incorporated herein by reference.

Figure 3:
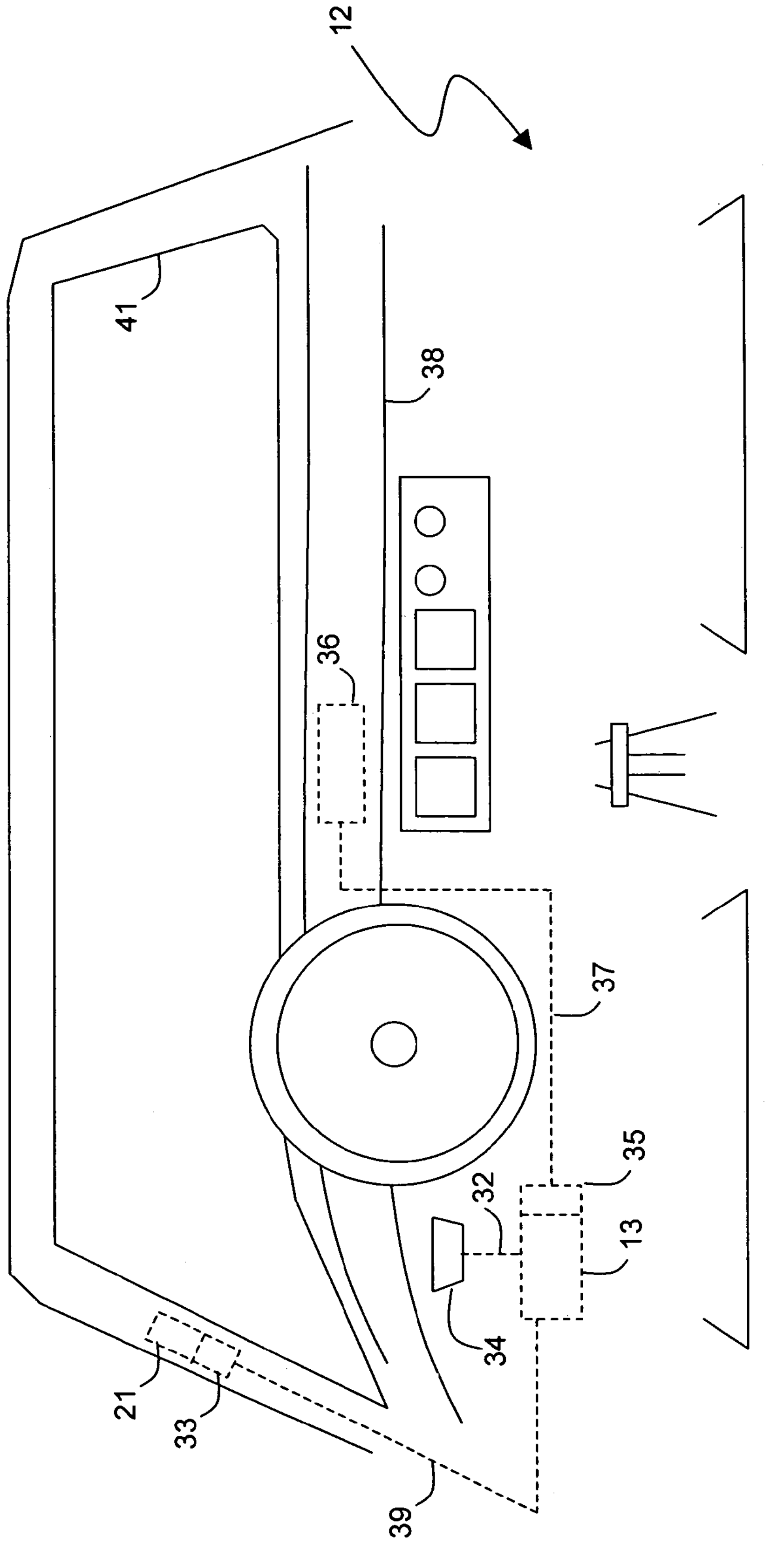
FIG. 3 is a semi-schematic drawing of a vehicle's driver and passenger compartments, featuring an in-vehicle telematics device and a peripheral device, according to one embodiment of the present invention.

FIG. 3 of an embodiment shows a schematic drawing of a vehicle 12 that hosts a telematics device 13 that connects to a peripheral device 36 through a cable 37 and serial interface 35. In this application, the peripheral device 36 is a LCD and keyboard mounted on the vehicle's dashboard 38. Once connected during an installation process, the peripheral device 36 transmits a numerical address through the cable 37 to the serial interface 35. A microprocessor in the telematics device interprets the address to recognize the peripheral device, and then begins to communicate.

The telematics device 13 may be installed under the vehicle's dash 38 and is not visible to the user. As described above, the telematics device 13 may connect to an OBD-II connector 34 in the vehicle 12 through a wiring harness 32, and is not in the driver's view. The OBD-II connector 34 powers the telematics device 13 and additionally provides a serial interface to the vehicle's engine computer. Through this interface the telematics device receives diagnostic information from the vehicle's OBD-II system, as is described in detail in the above-referenced patents, the contents of which have been incorporated by reference.

The telematics device 13 receives GPS signals from an antenna 21 mounted in a region, sometimes called the 'A pillar', located proximal to the vehicle's windshield 41. These signals are interpreted by the device and converted into GPS information, e.g. latitude, longitude, altitude, speed, and heading, by a GPS module included in the telematics device. The telematics device transmits GPS and diagnostic information as separate packets through a radio antenna 33, located near the GPS antenna in the vehicle's A pillar, and to a wireless network (e.g., Cingular's Mobitex network). The radio antenna 33 is matched to a frequency supported by the wireless network (e.g., approximately 900 MHz for the Mobitex network). A cabling rig 39 connects both the radio 33 and GPS 21 antennae to the telematics device 13.

The LCD and keyboard, for example, are installed on a front portion of the dash 38 and below the windshield 41, and are positioned so that the driver can easily view messages on the display. Messages can be used for general fleet management, e.g., to notify a fleet manager that a job has been completed, or to schedule an appointment with a customer. In this case, the radio antenna 33 is additionally used to receive and transmit text messages through the wireless network.

Figure 4:
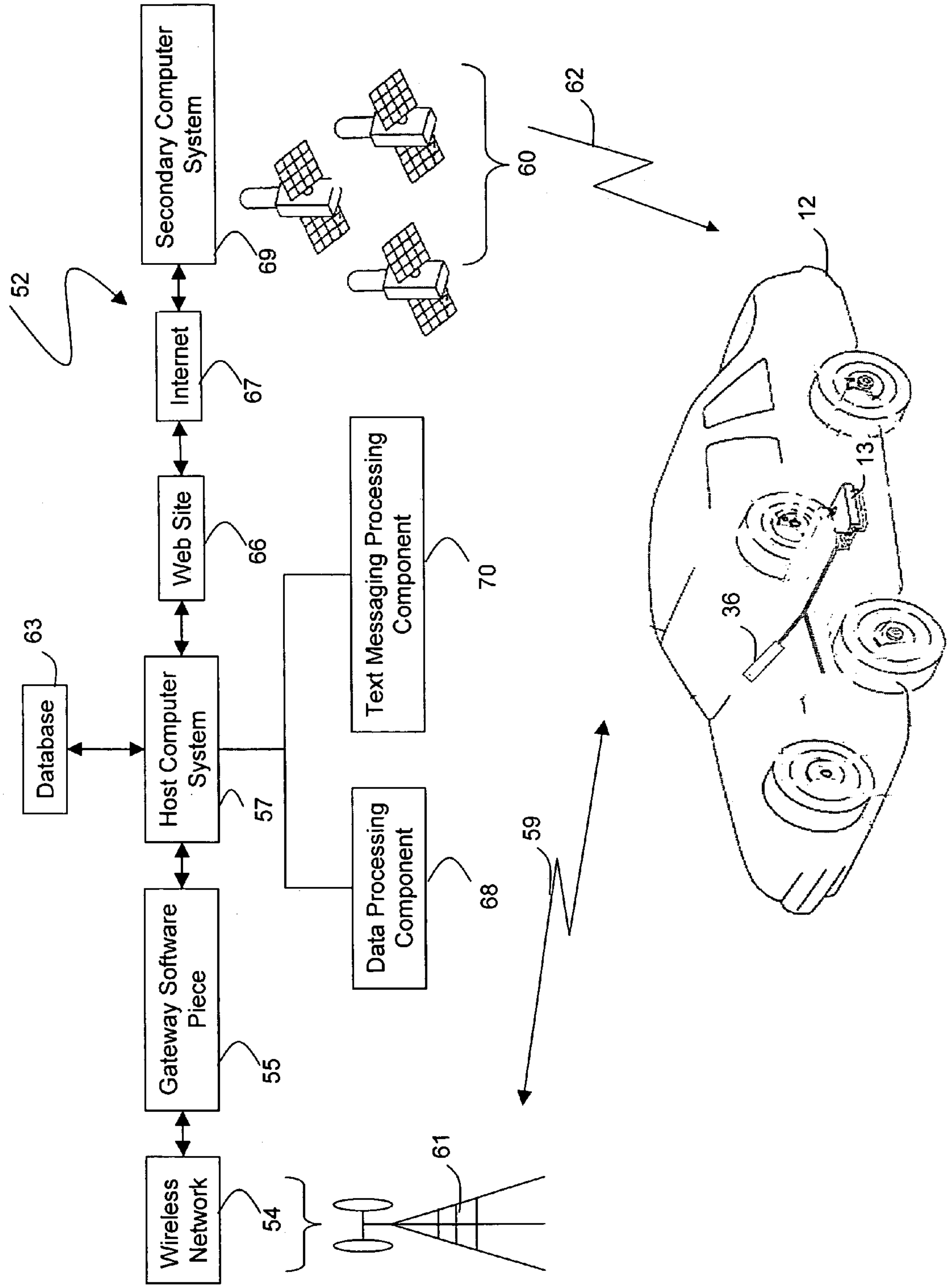
FIG. 4 is a schematic drawing of a vehicle featuring a wireless appliance that communicates with a GPS, a wireless communication network, and an Internet-accessible web site, according to one embodiment of the present invention.

FIG. 4 of an embodiment shows a schematic drawing of a telematics system 52 that uses the above-described telematics device 13 to monitor diagnostic and location-based information, and a peripheral device 36 (e.g., an LCD and keyboard) to, for example, display text messages. A fleet manager would use this system, for example, to manage a collection of drivers. The telematics device 13 and peripheral device 36 are installed in a host vehicle 12 as described above. During operation, the telematics device 13 retrieves and formats diagnostic and GPS information and text messages in separate packets and transmits these packets over an airlink 59 to a base station 61 included in a wireless network 54. The packets propagate through the wireless network 54 to a gateway software piece 55 running on a host computer system 57. The host computer system processes and stores information from the packets in a database 63 using the gateway software piece 55. The host computer system 57 additionally hosts a web site 66 that, once accessed, displays the information. A user (e.g. an individual working for a call center) accesses the web site 66 with a secondary computer system 69 through the Internet 67. The host computer system 57 includes a data-processing component 68 that analyzes the location and diagnostic information as described in more detail below.

The host computer system 57 also includes a text messaging-processing component 70 that processes text messages as described in more detail below. Once received by the vehicle, the peripheral device (i.e. and LCD and keyboard) displays the messages for the driver, and additionally allows the driver to send messages back to the fleet manager.

Figure 5A:
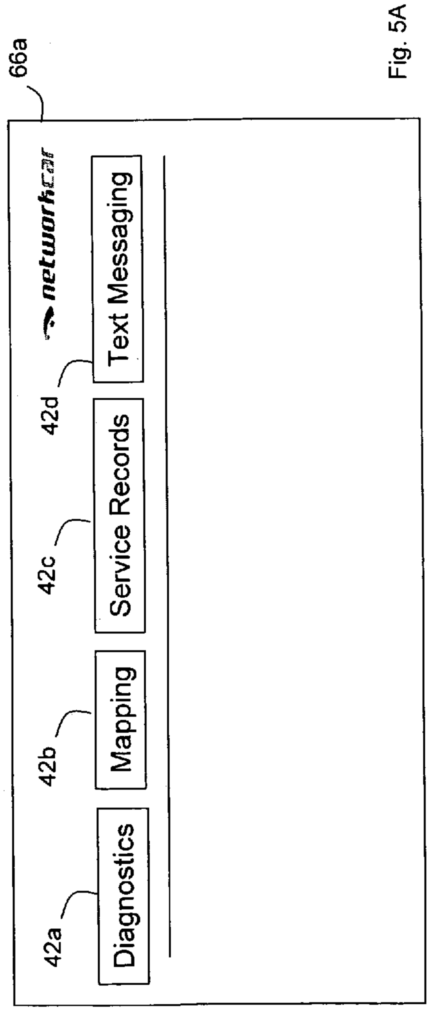
FIG. 5A is a semi-schematic drawing of an Internet-accessible web site featuring, respectively, tabs for information relating to diagnostics, location, service records, and text messaging, according to one embodiment of the present invention.

FIG. 5A of an embodiment shows an Internet-accessible web page **66*a* that allows, e.g., a fleet manager to view GPS and diagnostic information, as well as text messages, for each vehicle in the fleet. The web page 66*a* connects to the text messaging-processing software component shown in FIG. 4. It would be used, for example, in combination with a vehicle featuring a telematics device and LCD/keyboard peripheral device, such as that shown in FIG. 3**.

The web page **66*a* features tabs 42*a–d*** that link to secondary web pages that display, respectively, vehicle diagnostic information, GPS information and mapping, service records, and text messaging. Each of these web pages is described in detail below.

Figure 5B:
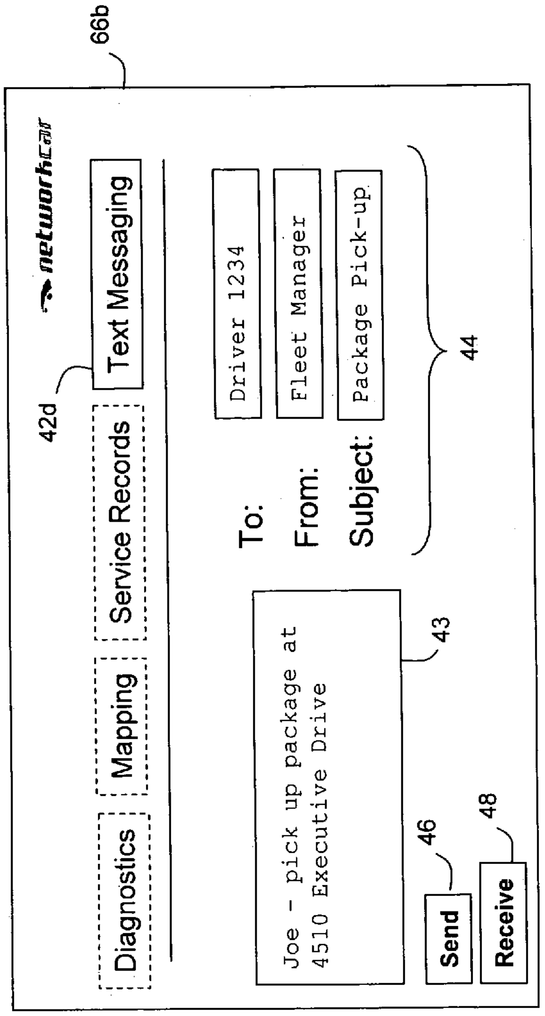
FIG. 5B is a semi-schematic drawing of an Internet-accessible web page that links to the web site of FIG. 5A and includes a user interface for sending and receiving text messages, according to one embodiment of the present invention.

FIG. 5B of an embodiment, for example, shows a simplified web page **66*b* that renders when a user clicks the tab 42*d* labeled 'Text Messaging' in the website shown in FIG. 5A. The web page 66*b* features a window 43 wherein the fleet manager can type in a text message that is then sent through the wireless network and displayed on an LCD for the driver of a particular vehicle. The web page 66*b* includes a field 44 that lists standard components of the text message, i.e. the destination of the text message, the sender, and the subject of the message. During operation, the fleet manager types the message in the window and wirelessly transmits it to the driver by clicking the 'Send' button 46. Similarly, the fleet manager receives incoming text messages in the window 43 by clicking the 'Receive' button 48**.

The web page **66*b* shown in FIG. 5**B may contain functionality that is consistent with state-of-the-art text messaging software. For example, these pages can link to additional web pages that include software systems for managing the text messages. These software systems include file-management systems for storing and managing incoming and outgoing messages; systems for sending messages to multiple vehicles in the fleet; systems for tracking the status of a message; systems for storing draft and standard, formatted messages (e.g., maps, directions, and standard responses); systems for sending standard messages; and systems for porting information from messages to other applications (using, e.g., Web Services software packages). Other message-processing systems are also within the scope of the invention.

Figure 6:
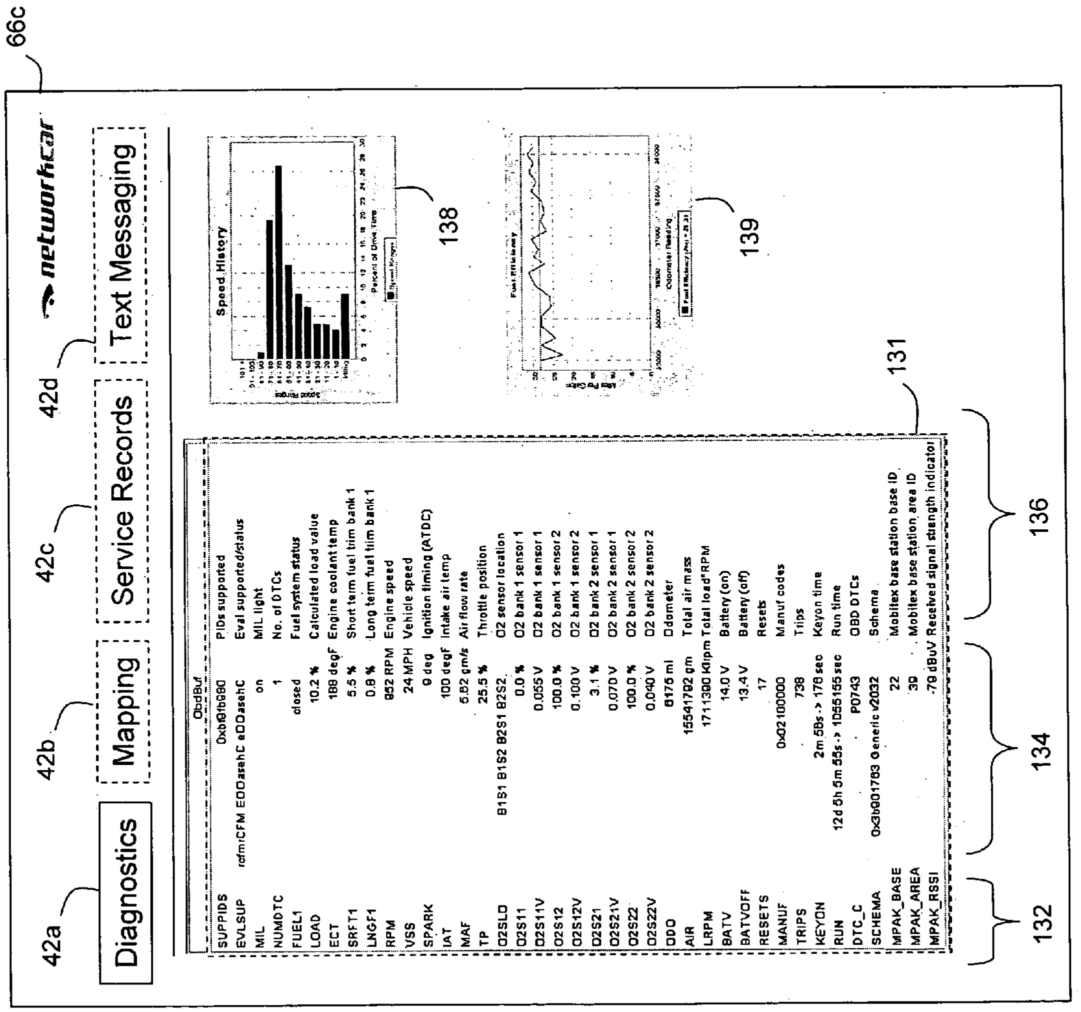
FIG. 6 is a semi-schematic drawing of an Internet-accessible web page that links to the web site of FIG. 5A and displays a vehicle's diagnostic data monitored by the telematics system of FIG. 1, according to one embodiment of the present invention.

FIG. 6 of an embodiment shows a web page **66*c* that renders when a user clicks the 'Diagnostics' tab 42*a* on the website shown in FIG. 5A. The web page 66*c* displays diagnostic data collected from the ECU of a particular vehicle as described above. The web page 66*c* includes a set of diagnostic data 131 and features fields listing an acronym 132, value and units 134, and brief description 136 for each datum. The web page 66*c* also includes graphs 138, 139 that plot selected diagnostic data in a time-dependent (graph 139) and histogram (graph 138**) formats. Other methods for displaying and processing the diagnostic data are also within the scope of the invention.

During operation of an embodiment, the in-vehicle telematics device automatically transmits a set of diagnostic data 131 at a periodic interval, e.g. every 20 to 40 minutes. The telematics device can also transmit similar data sets at random time intervals in response to a query from the host computer system (sometimes called a 'ping').

Detailed descriptions of these data, and how they can be further analyzed and displayed, are provided in the following patents, the contents of which are incorporated herein by reference: 1) WIRELESS DIAGNOSTIC SYSTEM AND METHOD FOR MONITORING VEHICLES (U.S. Pat. No.

6,636,790); and, INTERNET-BASED VEHICLE-DIAGNOSTIC SYSTEM (U.S. Pat. No. 6,611,740).

Figure 7:
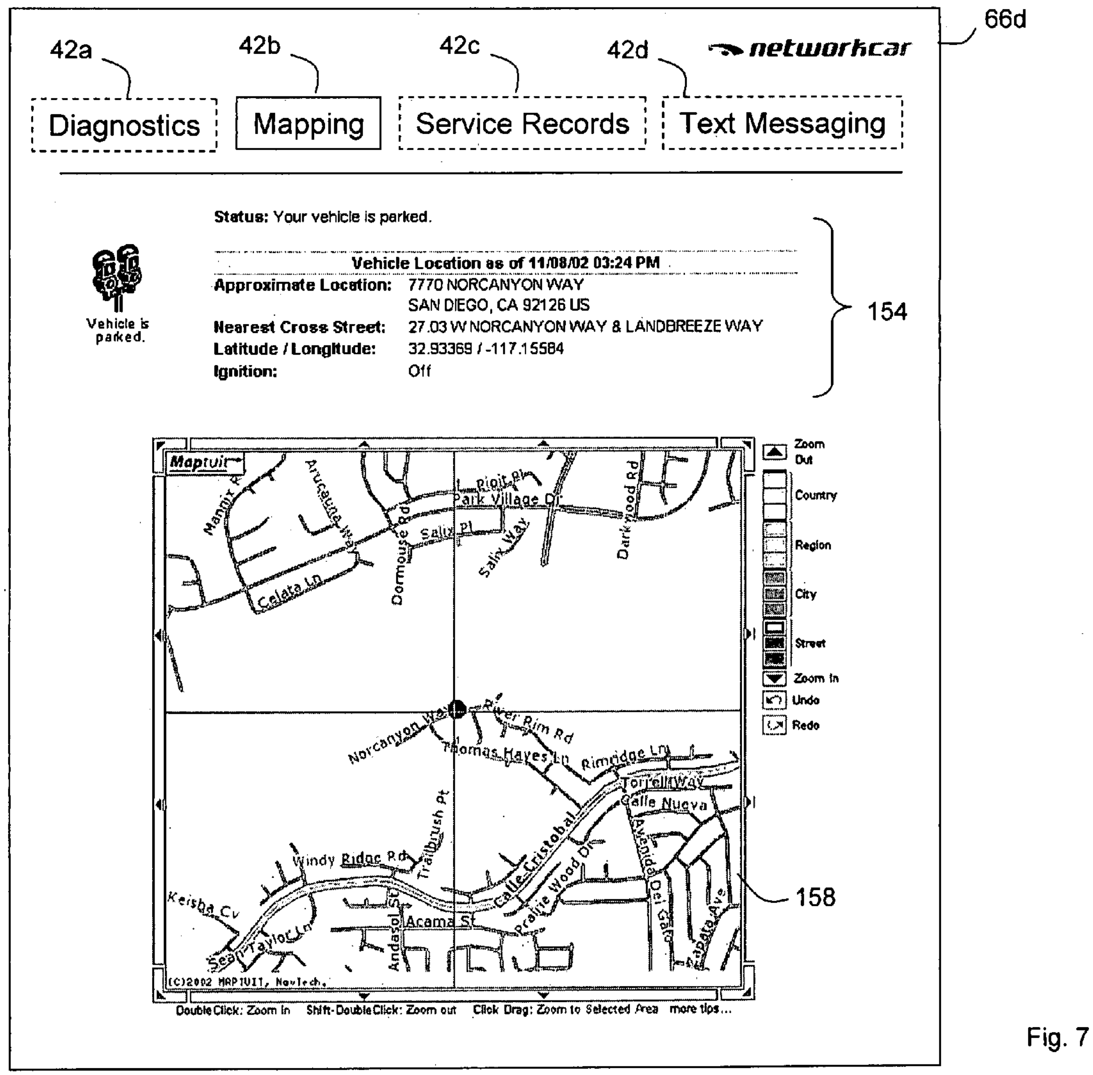
FIG. 7 is a semi-schematic drawing of an Internet-accessible web page that links to the web site of FIG. 5A and displays a vehicle's numerical latitude and longitude and a map showing the vehicle's location monitored by the telematics system of FIG. 1, according to one embodiment of the present invention.

FIG. 7 of an embodiment shows a web page 66*d* that renders when a user clicks the 'Mapping' tab 42*b* on the website shown in FIG. 5A. The web page 66*d* displays, respectively, GPS data 154 and a map 158 that together indicate a vehicle's location. In this case, the GPS data 154 include the time and date, the vehicle's latitude, longitude, a 'reverse geocode' of these data indicating a corresponding street address, the nearest cross street, and a status of the vehicle's ignition (i.e., 'on' or 'off' and whether or not the vehicle is parked or moving). The map 158 displays these coordinates in a graphical form relative to an area of, in this case, a few square miles. In some embodiments, the web page 66*d* is rendered each time the GPS data are periodically transmitted from a vehicle (e.g., every 1–2 minutes) and received by the data-processing component of the website.

Both the map and a database that translates the latitude and longitude into a reverse geocode are hosted by an external computer server and are accessible though an Internet-based protocol, e.g. XML, Web Services, or TCP/IP. Companies such as MapTuit, MapQuest, and NavTech host software that provides maps and databases such as these. Methods for processing location-based data, taken alone or in combination with diagnostic data, are described in detail in the patent application 'WIRELESS, INTERNET-BASED SYSTEM FOR TRANSMITTING AND ANALYZING GPS DATA', U.S. Pat. No. 10,301,010, the contents of which are incorporated herein by reference.

Figure 8:
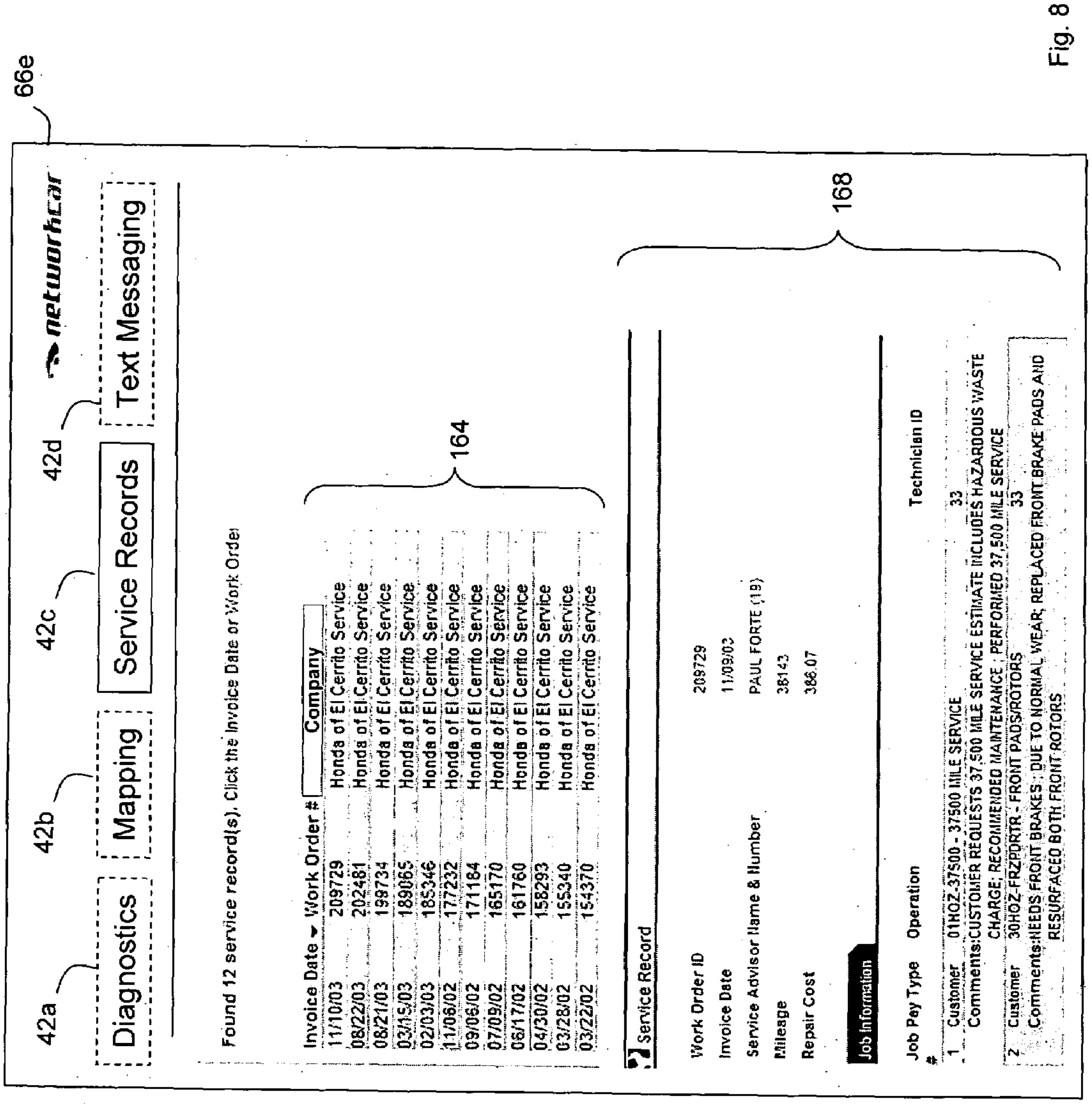
FIG. 8 is a semi-schematic drawing of an Internet-accessible web page that links to the web site of FIG. 5A and displays a vehicle's service records generated using a data management system for an automotive dealership, according to one embodiment of the present invention.

FIG. 8 of an embodiment shows a web page 66*e* that renders when a user clicks the 'Service Records' tab 42*c* on the website shown in FIG. 5A. The web page 66*e* displays, respectively, a list of service records 164 for a particular vehicle, and an individual service record 168 that describes a particular example of how the vehicle was repaired. The list of service record 164 shows: 1) the date of the service; 2) a work order number; and, 3) the company providing the service. In addition to this information, the individual service record 168 describes: 1) the type of service; 2) the mechanic that completed the service; 3) the cost of the service; 4) the mileage on the vehicle at the time of the service; and 5) a few comments describing the service.

To display service records like those shown in FIG. 8, the host computer system of an embodiment of the present invention may interface with a data-management system that runs of a computer system at an automotive dealership. Such a system, for example, is the ERA software system developed and marketed by Reynolds and Reynolds, based in Dayton, Ohio. Systems like ERA transfer service records to the host computer system through a variety of means. These include, for example, XML, XML-based Web Services, file transfer protocol (FTP), and email.

The web page can also show service records describing service performed by organizations other than an automotive dealership, e.g., by the vehicle owner or another entity (e.g. Jiffy Lube). These records may be entered by hand into a web page similar to that shown in FIG. 8.

Figure 9:
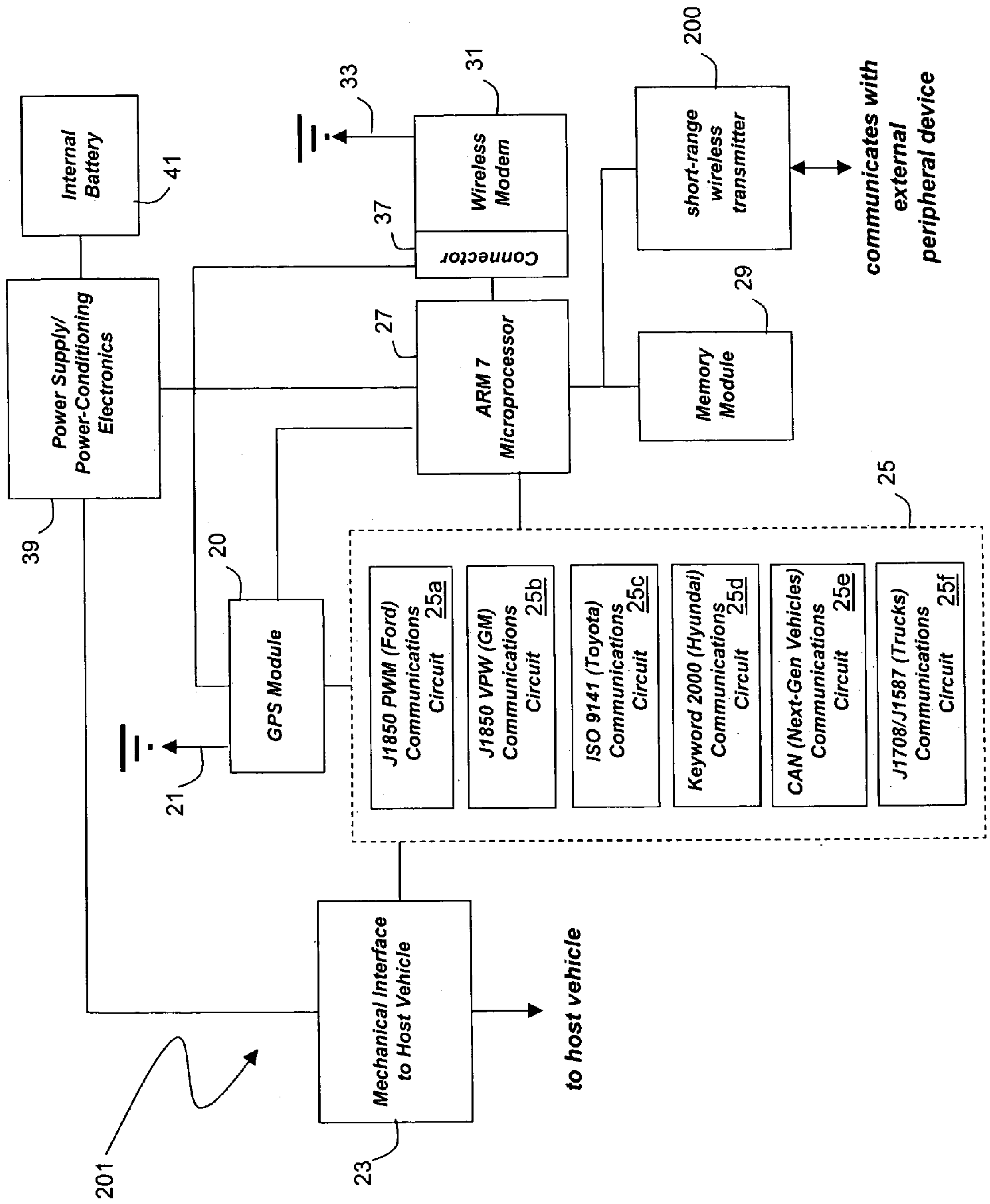
FIG. 9 is a schematic drawing of the in-vehicle telematics device featuring a wireless modem, GPS, vehicle-communication circuits, and a short-range wireless transmitter, according to one embodiment of the present invention.
Figure 10:
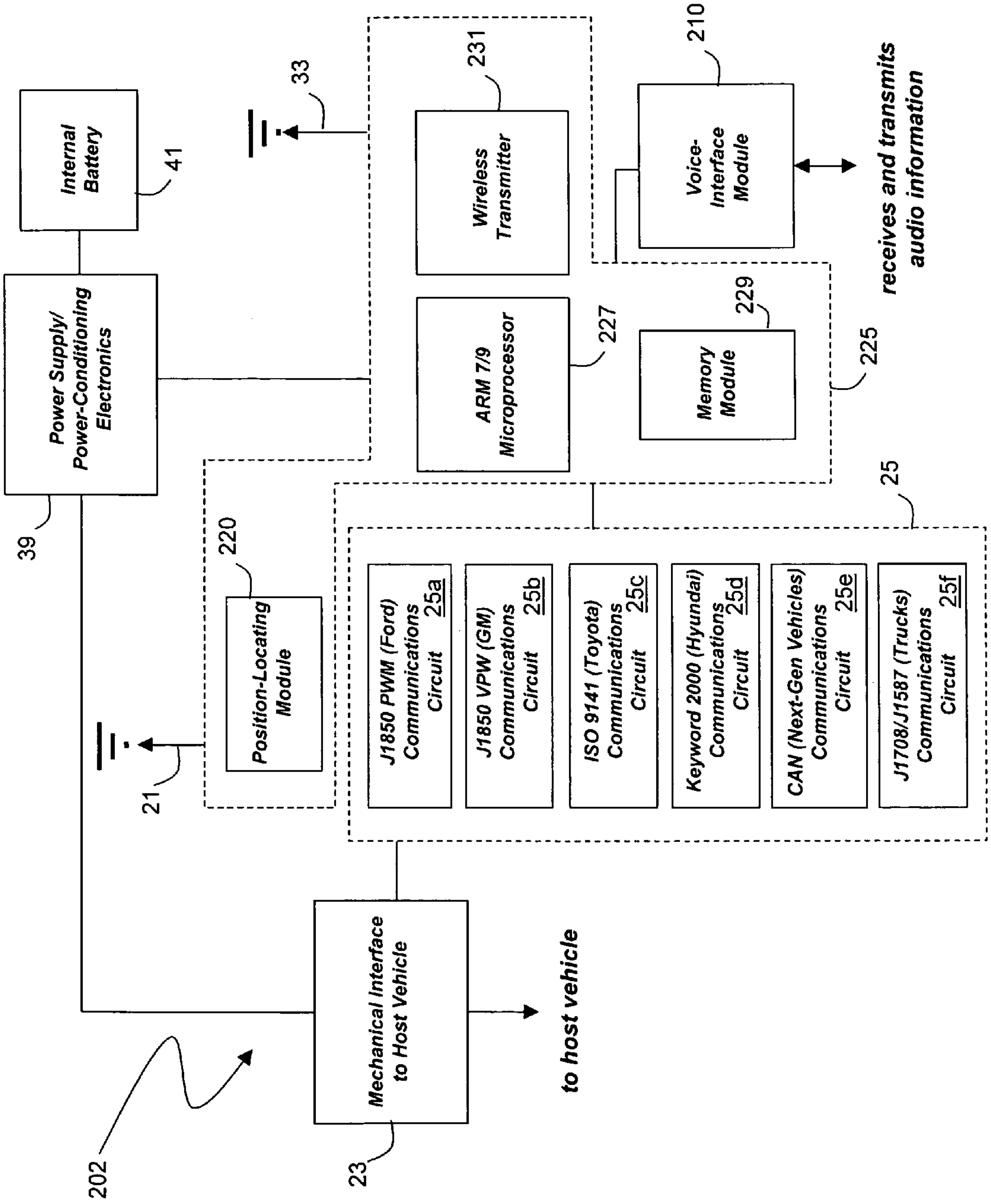
FIG. 10 is a schematic drawing of the in-vehicle telematics device featuring a single chipset-based that includes a wireless transmitter, position-locating module, memory, and a microprocessor, vehicle-communication circuits, and a voice interface for transmitting audio information, according to one embodiment of the present invention.

FIGS. 9 and 10 describe alternate embodiments of the invention. These embodiments are based on the telematics device shown in FIG. 1, but include additional hardware components that add functionality to the device. For example, FIG. 9 shows a telematics device 201, similar to the device shown in FIG. 1, which additionally includes a short-range wireless transmitter 200 that sends diagnostic, location, and other information to a remote receiver. The short-range wireless transmitter 200 can be a stand-alone module that attaches to the same circuit board used to support all the components shown in FIG. 9. The remote receiver can be one of the external peripheral devices (such as a display) shown above, or can be a device such as an automotive scan tool, computer system, cellular phone, or PDA. The short-range wireless transmitter may be a high-bandwidth transmitter, e.g. a transmitter using Bluetooth™ or 802.11b technology. Alternatively, the short-range wireless transmitter can be a low-bandwidth transmitter, e.g. a transmitter using part-15, infrared, or other optical technology.

FIG. 10 shows alternate embodiments of the telematics device 202 featuring a single chipset 225 that performs multiple functions. The chipset 225, for example, includes a wireless transmitter 231, an ARM microprocessor 227 (which may be an ARM7 or ARM9), a memory module 229, and a position-locating module 220. Each of these components is integrated directly into silicon-based systems on the chipset 225. The components connect to each other through metallization layers in the chipset 225. In addition, the chipset 225 connects to a voice-interface module 210 (e.g. a hand's-free interface, including a microphone and a speaker) that receives audio input (e.g. a user's voice) and sends this through the chipset 225 to the wireless transmitter 231 for transmission.

The chipset often runs firmware, stored in the memory module 229 and run on the microprocessor 227, that performs simple voice recognition so that a user can initiate a call, search for and dial a telephone number, and then end a call, all without touching the device. In this capacity the telematics device operates like a cellular telephone integrated with a hand's-free phone kit. The wireless transmitter 231 must therefore be a high-bandwidth transmitter, e.g. a transmitter that operates on a CDMA or GSM network. Chipsets such as those manufactured by Qualcomm, e.g. the MSM6025, MSM6050, and the MSM6500, include such wireless transmitters, and can therefore be used in the present invention. These chipsets are described and compared in detail in the following website: http://www.qualcomm.com. The MSM6025 and MSM6050 chipsets operate on both CDMA cellular and CDMA PCS wireless networks, while the MSM6500 operates on these networks and GSM wireless networks. In addition to circuit-switched voice calls, the wireless transmitter 231 can transmit data in the form of packets at speeds up to 307 kbps in mobile environments.

The chipset 225 shown in FIG. 10 determines a location of the host vehicle using the position-locating module 220. In particular, the chipsets described above use a position-locating technology developed by Qualcomm called Snap Track/GPSone™, which operates a 'network assisted' GPS technology. Snap Track/GPSone™ operates by collecting GPS signals from overlying satellites (like a conventional GPS) and radio signals transmitted from an individual wireless transmitter and base stations (which have known, stationary locations) included in a cellular or PCS wireless network. This information is sent to a position determining entity ('PDE'), which may be typically located in the wireless network and processes the information to calculate an accurate location (e.g., latitude, longitude, and altitude) of the wireless transmitter. Once this information is calculated, the PDE and sends the position back to the wireless transmitter, where the telematics device processes it as described above.

In addition to the above described functions, the above-described chipsets include modules that support the following applications: playing music and video recordings; recording and replaying audio information; processing images from digital cameras; playing video games; and driving color and black-and-white displays. Each of these applications can be therefore integrated into the telematics devices described above.

Other embodiments are also within the scope of the invention. In particular, hardware architectures other than that described above can be used for the telematics device. For example, the ARM7 microprocessor used to run the appliance's firmware could be contained within the GPS module. Or a different microprocessor may be used. Similarly, serial protocols other than $I^2C$ can be used to communicate with the peripheral devices. These include USB, CAN, RS485, and SPI.

Web pages used to display the data can take many different forms, as can the manner in which the data are displayed, the nature and format of the data, and the computer code used to generate the web pages. In addition, web pages may also be formatted using standard wireless access protocols (WAP) so that they can be accessed using wireless devices such as cellular telephones, personal digital assistants (PDAs), and related devices. In addition, these devices can display text messages sent using the above-described system. In still other embodiments, the above-described system is used to locate vehicle or things other than cars and trucks, such as industrial equipment or shipping containers.

In general, it will be apparent to one of ordinary skill in the art that some of the embodiments as described hereinabove may be implemented in many different embodiments of software, firmware, and hardware in the entities illustrated in the figures. The actual software code or specialized control hardware used to implement some of the present embodiments is not limiting of the present invention. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Moreover, the processes associated with some of the present embodiments may be executed by programmable equipment, such as computers. Software that may cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable medium at a later date. Such a medium may include any of the forms listed above with respect to storage devices and may further include, for example, a carrier wave modulated, or otherwise manipulated, to convey instructions that can be read, demodulated/decoded and executed by a computer.

It can be appreciated, for example, that some process aspects described herein may be performed, in certain embodiments, using instructions stored on a computer-readable medium or media that direct a computer system to perform the process aspects. A computer-readable medium can include, for example, memory devices such as diskettes, compact discs of both read-only and read/write varieties, optical disk drives, and hard disk drives. A computer-readable medium can also include memory storage that can be physical, virtual, permanent, temporary, semi-permanent and/or semi-temporary. A computer-readable medium can further include one or more data signals transmitted on one or more carrier waves.

A "computer" or "computer system" may be, for example, a wireless or wireline variety of a microcomputer, minicomputer, laptop, personal data assistant (PDA), wireless e-mail device (e.g., BlackBerry), cellular phone, pager, processor, or any other programmable device, which devices may be capable of configuration for transmitting and receiving data over a network. Computer devices disclosed herein can include memory for storing certain software applications used in obtaining, processing and communicating data. It can be appreciated that such memory can be internal or external. The memory can also include any means for storing software, including a hard disk, an optical disk, floppy disk, ROM (read only memory), RAM (random access memory), PROM (programmable ROM), EEPROM (electrically erasable PROM), and other computer-readable media.

It is to be understood that the figures and descriptions of the embodiments of the present invention have been simplified to illustrate elements that are relevant for a clear understanding of the present invention, while eliminating, for purposes of clarity, other elements. Those of ordinary skill in the art will recognize that these and other elements may be desirable. However, because such elements are well known in the art, and because they do not facilitate a better understanding of the present invention, a discussion of such elements is not provided herein.

In some embodiments of the present invention disclosed herein, a single component can be replaced by multiple components, and multiple components replaced by a single component, to perform a given function or functions. Except where such substitution would not be operative to practice embodiments of the present invention, such substitution is within the scope of the present invention.

What is claimed is:

1. An in-vehicle telematics system comprising:

a controller;

a diagnostics system, communicating with the controller, configured to receive diagnostic information from a host vehicle;

a position-locating system, communicating with the controller, configured to determine location information of the host vehicle;

a communication interface, communicating with the controller, configured to send additional information to an in-vehicle peripheral system other than the diagnostic and position-locating systems, wherein the in-vehicle peripheral system comprises a short-range wireless transmitter, and wherein the communication interface is configured to universally interface with different peripheral systems; and, a wireless transmitter, communicating with the controller, configured to transmit information through a wireless network to an Internet-accessible website.

2. The system of claim 1, wherein the peripheral system is a display.

3. The system of claim 2, wherein the display is an LCD.

4. The system of claim 2, wherein the controller controls the display.

5. The system of claim 4, wherein the controller is configured to cause a text message to be displayed on the display.

6. The system of claim 5, wherein the text message is received from the Internet-accessible website.

7. The system of claim 5, wherein the text message is received from a cellular telephone or a personal digital assistant.

8. The system of claim 2, wherein the display is configured to mount inside the vehicle.

9. The system of claim 1, wherein the peripheral system comprises a voice interface that receives audio information and sends the information to the wireless transmitter.

10. The system of claim 9, wherein the peripheral system is a hands-free phone kit.

11. The system of claim 10, further comprising a Bluetooth™ transmitter configured to send information to and receive information from the hands-free phone kit.

12. The system of claim 1, wherein the peripheral system comprises a transceiver.

13. The system of claim 1, wherein the short-range wireless transmitter is a transmitter operating a Bluetooth™, 802.11, part-15, or infrared wireless protocol.

14. The system of claim 1, wherein the peripheral system comprises a button that, when depressed, sends a signal through the interface to the controller.

15. The system of claim 1, wherein the peripheral system is a secondary wireless modem.

16. The system of claim 15, wherein the secondary wireless modem is a satellite modem.

17. The system of claim 1, wherein the interface is a serial interface.

18. The system of claim 17, wherein the serial interface is an $I^2C$, RS232, RS485, USB, CAN or SPI interface.

19. The system of claim 1, wherein the position-locating system is a GPS.

20. The system of claim 1, wherein the position-locating system is a network-assisted GPS.

21. The system of claim 1, wherein the controller is a microprocessor or a microcontroller.

22. An in-vehicle telematics system comprising:

a controller configured to receive diagnostic information from a host vehicle and location information from a position-locating system, and additionally configured to receive and send information through a serial interface to an in-vehicle peripheral device other than the diagnostic and position-locating systems, wherein the in-vehicle peripheral device comprises a short-range wireless transmitter, and wherein the serial interface is configured to universally interface with different peripheral systems; and, a wireless transmitter configured to receive diagnostic and location information and transmit this information through a wireless network to an Internet-accessible website.

23. The system of claim 22, wherein the peripheral device is a display.

24. The system of claim 23, wherein the display is an LCD.

25. The system of claim 24, wherein the controller is configured to cause a text message to be displayed on the display.

26. The system of claim 25, wherein the text message is received from the Internet-accessible website.

27. The system of claim 26, wherein the text message is received from a cellular telephone or a personal digital assistant.

28. The system of claim 23, wherein the display is configured to mount inside the vehicle.

29. The system of claim 22, wherein the peripheral device comprises a voice interface that receives audio information and sends the information to the wireless transmitter.

30. The system of claim 29, wherein the voice interface is a hands-free phone kit.

31. The system of claim 30, wherein the system further comprises a Bluetooth™ transmitter configured to send information to and receive information from the hands-free phone kit.

32. The system of claim 22, wherein the peripheral device comprises a transceiver.

33. The system of claim 22, wherein the short-range wireless transmitter is a transmitter operating a Bluetooth™, 802.11, part-15, or infrared wireless protocol.

34. The system of claim 22, wherein the peripheral device comprises a button that, when depressed, sends a signal through the interface to the controller.

35. The system of claim 22, wherein the peripheral device is a secondary wireless modem.

36. The system of claim 35, wherein the secondary wireless modem is a satellite modem.

37. The system of claim 22, wherein the interface is a serial interface.

38. The system of claim 37, wherein the serial interface is an $I^2C$, RS232, RS485, USB, CAN or SPI interface.

39. The system of claim 22, wherein the controller is a microprocessor or a microcontroller.

40. An in-vehicle telematics system comprising:

a controller;

a position-locating system, communicating with the controller, configured to determine location information of the host vehicle;

a communication interface, communicating with the controller, configured to send additional information to an external peripheral system, wherein the communication interface is configured to universally interface with different in-vehicle peripheral systems, and wherein the in-vehicle peripheral system comprises a short-range wireless transmitter;

a housing that covers the controller and the position-locating system and includes a port communicating with the external peripheral system; and, a wireless transmitter, communicating with the controller, configured to transmit information through a wireless network to an Internet-accessible website.

41. The system of claim 40, further comprising a cable that sends information to and receives information from the external peripheral system.

42. An in-vehicle telematics system comprising:

a controller;

a position-locating system, communicating with the controller, configured to determine location information of the host vehicle;

an in-vehicle short-range wireless transmitter, communicating with the controller, configured to send information to an in-vehicle peripheral device; and, a long-range wireless transmitter, communicating with the controller, configured to transmit information through a wireless network to an Internet-accessible website.

43. The system of claim 42, wherein the short-range wireless transmitter is a transmitter operating a Bluetooth™, 802.11, part-15 or infrared wireless protocol.

44. An in-vehicle telematics system comprising:

a controller;

a diagnostics system, communicating with the controller, configured to receive diagnostic information from a host vehicle;

a position-locating system, communicating with the controller, configured to determine location information of the host vehicle;

a display, communicating with the controller through a serial interface, configured to display information sent from an Internet-accessible website, wherein the serial interface is configured to universally interface with different in-vehicle peripheral systems, wherein the in-vehicle peripheral systems comprise a short-range wireless transmitter; and, a wireless transmitter, communicating with the controller, configured to transmit information through a wireless network to an Internet-accessible website.

45. An in-vehicle telematics system comprising:

a controller;

a position-locating system, communicating with the controller, configured to determine location information of the host vehicle;

a voice interface, communicating with the controller, configured to receive and send voice information to an in-vehicle peripheral system, wherein the in-vehicle peripheral system comprises a short-range wireless transmitter; and, a wireless transmitter, communicating with the controller, configured to transmit location information through a wireless network to an Internet-accessible website, and configured to transmit voice information through the wireless network.

46. The system of claim 45, wherein the wireless transmitter is configured to transmit location information through the wireless network to the Internet-accessible website, and voice information through the wireless network to an external telephone.

47. The system of claim 46, wherein the controller further comprises a speech-recognition module.

48. The system of claim 47, wherein the speech-recognition module is configured to analyze speech of a user to determine a telephone number.

* * * * *